United States Patent
Liang et al.

(10) Patent No.: US 10,278,229 B2
(45) Date of Patent: Apr. 30, 2019

(54) METHOD FOR PROCESSING SOCKET, METHOD AND APPARATUS FOR TRANSMITTING PACKET DATA

(75) Inventors: Jiehui Liang, Shenzhen (CN); Shengjuan Wang, Shenzhen (CN); Jianyong Li, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 103 days.

(21) Appl. No.: 14/115,462

(22) PCT Filed: Feb. 13, 2012

(86) PCT No.: PCT/CN2012/071048
§ 371 (c)(1),
(2), (4) Date: Dec. 27, 2013

(87) PCT Pub. No.: WO2013/000284
PCT Pub. Date: Jan. 3, 2013

(65) Prior Publication Data
US 2014/0112278 A1    Apr. 24, 2014

(30) Foreign Application Priority Data
Jun. 29, 2011   (CN) .......................... 2011 1 0178421

(51) Int. Cl.
*H04W 76/20*   (2018.01)
*H04L 29/06*   (2006.01)

(52) U.S. Cl.
CPC ........... *H04W 76/20* (2018.02); *H04L 69/162* (2013.01)

(58) Field of Classification Search
CPC ....... H04L 69/162; H04L 49/90; H04L 69/04; H04L 63/0485; H04W 76/04
(Continued)

(56) References Cited

U.S. PATENT DOCUMENTS

| | | | | |
|---|---|---|---|---|
| 5,802,306 | A | * | 9/1998 | Hunt ....................... H04L 29/06 370/245 |
| 6,064,671 | A | * | 5/2000 | Killian ................ H04W 60/005 370/389 |

(Continued)

FOREIGN PATENT DOCUMENTS

| | | |
|---|---|---|
| CN | 101087314 | 12/2007 |
| CN | 101217464 | 7/2008 |

(Continued)

*Primary Examiner* — Jamaal R Henson
(74) *Attorney, Agent, or Firm* — Pearl Cohen Zedek Latzer Baratz LLP

(57) ABSTRACT

Disclosed is a method for processing a SOCKET, a method and an apparatus for transmitting packet data, wherein, the method for processing a SOCKET comprises: a connection management application obtaining a SOCKET identifier corresponding to each service application, and transmitting the SOCKET identifier and a modification instruction to a TCP/IP (Transmission Control Protocol/Internet Protocol) protocol stack; the TCP/IP protocol stack searching for SOCKET file description information corresponding to the SOCKET identifier, and modifying the SOCKET file description information according to the modification instruction. After adopting the technical solution mentioned above, the IP binding operation across applications can be performed on a single-process or multi-process operating system, and the application level traffic selection of the different data connection can be performed according to intention of a user.

4 Claims, 3 Drawing Sheets

(58) Field of Classification Search
USPC .................. 370/329; 709/237, 238, 220, 227
See application file for complete search history.

(56) References Cited

U.S. PATENT DOCUMENTS

| | | | | |
|---|---|---|---|---|
| 6,397,255 | B1* | 5/2002 | Nurenberg | H04L 29/06 709/228 |
| 6,490,719 | B1* | 12/2002 | Thomas | G06F 9/44521 717/107 |
| 6,728,885 | B1* | 4/2004 | Taylor | H04L 63/0263 709/238 |
| 7,099,285 | B1* | 8/2006 | Kanuri | H04L 49/604 370/254 |
| 7,171,473 | B1* | 1/2007 | Eftis | H04L 51/04 709/227 |
| 7,171,492 | B1* | 1/2007 | Borella | H04L 69/16 709/245 |
| 7,174,192 | B2* | 2/2007 | Nagahama | H04M 1/6041 370/242 |
| 7,343,421 | B1* | 3/2008 | Goyal | G06F 9/468 709/238 |
| 7,587,510 | B1* | 9/2009 | Klager | G06F 9/545 709/232 |
| 8,893,113 | B1* | 11/2014 | Nguyen | H04L 67/10 717/168 |
| 2001/0052023 | A1* | 12/2001 | Lin | H04M 1/2471 709/237 |
| 2003/0001883 | A1* | 1/2003 | Wang | G06F 3/0481 715/736 |
| 2003/0105812 | A1* | 6/2003 | Flowers et al. | 709/203 |
| 2003/0185233 | A1* | 10/2003 | Ji | H04L 12/5692 370/466 |
| 2003/0204593 | A1* | 10/2003 | Brown | H04L 41/0816 709/225 |
| 2004/0199650 | A1* | 10/2004 | Howe et al. | 709/230 |
| 2004/0246971 | A1* | 12/2004 | Banerjee | H04L 29/06 370/395.5 |
| 2005/0083894 | A1* | 4/2005 | Tagawa | 370/338 |
| 2005/0108571 | A1* | 5/2005 | Lu | G06F 21/34 726/4 |
| 2005/0198384 | A1* | 9/2005 | Ansari | H04W 36/0011 709/245 |
| 2005/0210126 | A1* | 9/2005 | Friedman | 709/220 |
| 2006/0015651 | A1* | 1/2006 | Freimuth | G06F 13/30 709/250 |
| 2006/0075119 | A1* | 4/2006 | Hussain | H04L 49/90 709/227 |
| 2006/0075123 | A1* | 4/2006 | Burr | H04L 29/12311 709/228 |
| 2007/0110046 | A1* | 5/2007 | Farrell et al. | 370/389 |
| 2008/0040489 | A1* | 2/2008 | Hockett | H04L 12/40013 709/228 |
| 2008/0140847 | A1* | 6/2008 | Almog | H04L 29/12066 709/228 |
| 2009/0067435 | A1* | 3/2009 | Packett | H04L 45/745 370/395.31 |
| 2009/0299937 | A1* | 12/2009 | Lazovsky | H04L 29/12113 706/47 |
| 2009/0300162 | A1* | 12/2009 | Demarie | H04L 67/26 709/224 |
| 2010/0185755 | A1* | 7/2010 | Hammam | H04L 29/12301 709/221 |
| 2011/0082909 | A1* | 4/2011 | Ishibashi | H04L 29/04 709/217 |
| 2012/0005369 | A1* | 1/2012 | Capone | H04L 69/161 709/236 |
| 2012/0030687 | A1* | 2/2012 | Bhandiwad | G06F 9/544 719/312 |
| 2012/0278878 | A1* | 11/2012 | Barkie et al. | 726/15 |

FOREIGN PATENT DOCUMENTS

| | | |
|---|---|---|
| CN | 101984713 | 3/2011 |
| CN | 102223307 | 10/2011 |
| JP | 2007-329750 | 12/2007 |

* cited by examiner

METHOD FOR PROCESSING SOCKET, METHOD AND APPARATUS FOR TRANSMITTING PACKET DATA

CROSS-REFERENCE TO RELATED APPLICATIONS

This application is a National Phase Application of PCT International Application No. PCT/CN2012/071048, entitled "METHOD FOR PROCESSING SOCKET, METHOD AND APPARATUS FOR TRANSMITTING PACKET DATA", International Filing Date Feb. 13, 2012, published on Jan. 3, 2013 as International Publication No. WO 2013/000284, which in turn claims priority from Chinese Patent Application No. 201110178421.X, filed Jun. 29, 2011, both of which are incorporated herein by reference in their entirety.

TECHNICAL FIELD

The present document relates to the field of communications, and in particular, to a method for processing a SOCEKT, and a method and apparatus for transmitting packet data.

BACKGROUND OF THE RELATED ART

At present, the terminal can have a variety of packet data connections, including General Packet Radio Service (GPRS) for the $2^{th}$ Generation (2G) communication system, Time Division-Synchronous Code Division Multiple Access (TD-SCDMA), Wideband Code Division Multiple Access (WCDMA), CDMA2000 of the data connection for the $3^{rd}$ Generation (3G), Enhanced Data rates for GSM Evolution (EDGE) between 2G and 3G, High Speed Packet Access (HSPA) between 3G and 4G, LTE, Wireless Local Area Network (WLAN), Wireless Fidelity (Wifi) and Worldwide Interoperability for Microwave Access (WiMax) for the $4^{th}$ generation (4G) communication system. The terminal can have more than two data connection modes, various data connection modes have significant difference in terms of billing and Quality of Service (QoS), and how to reasonably select different data connections by the application on the terminal and how to select the most suitable data connection in the case of coexistence of multiple packet data connections will eventually affect the user experience.

At present, when the terminal is in the face of coexistence of multiple packet data connections, different packet data traffics are selected by configuring routing, and as the routing configuration only relates to the differentiation of network segments of target addresses, it is unable to select the traffic application level by application level. When the terminal is in the face of selection of the traffic on the application level, the traffic can be differentiated only by binding an IP address of a corresponding data connection manually, and the traffic is unable to be selected in accordance with the intention of the user adaptively. Due to the difference among the operating systems of the terminals, for some embedded operating systems (single-process), the IP binding operation can be performed across the application levels, while for some operating systems (multi-process), such operation is unable to be performed.

SUMMARY OF THE INVENTION

The technical problem to be solved by the present document is to provide a method for processing a SOCKET, a method and apparatus for transmitting packet data, and the packet data link can be selected in accordance with the intention of the user application by application or service by service.

In order to solve the above technical problem, the present document uses the following technical schemes:

A method for processing a SOCKET, comprising:

a connection management application obtaining a SOCKET identifier corresponding to each service application, and transmitting the SOCKET identifier and a modification instruction to a TCP/IP (Transmission Control Protocol/Internet Protocol) protocol stack;

the TCP/IP protocol stack searching for SOCKET file description information corresponding to the SOCKET identifier, and modifying the SOCKET file description information according to the modification instruction.

The method further comprises:

after obtaining the SOCKET identifier corresponding to each service application, the connection management application giving a prompt for network link information related to the service application.

An apparatus for processing a SOCKET, comprising a connection management application module and a TCP/IP protocol stack module, wherein, the connection management application module is configured to obtain a SOCKET identifier corresponding to each service application, and transmit the SOCKET identifier and a modification instruction to the TCP/IP protocol stack module;

the TCP/IP protocol stack module is configured to search for SOCKET file description information corresponding to the SOCKET identifier, and modify the SOCKET file description information according to the modification instruction.

Wherein, the connection management application module is further configured to give a prompt for network link information related to the service application after obtaining the SOCKET identifier corresponding to each service application.

A method for transmitting packet data, comprising:

a connection management application obtaining a SOCKET created by each service application, searching for an IP address of a specified network link which corresponds to the service application, and transmitting the SOCKET identifier, the IP address and a link modification instruction to a TCP/IP protocol stack;

the TCP/IP protocol stack searching for the SOCKET file description information corresponding to the SOCKET identifier, and modifying a source IP address in the SOCKET file description information to the IP address of the specified network link according to the link modification instruction; and the TCP/IP protocol stack transmitting the packet data of the service application through the specified network link.

Wherein, the method further comprises:

after obtaining the SOCKET created by each service application, the connection management application giving a prompt for an option of all supported network links, and receiving one option selected by a user;

wherein the step of searching for an IP address of a specified network link which corresponds to the service application comprises: searching for an IP address of a network link corresponding to the option according to information of the option selected by the user.

Wherein, the step of searching for an IP address of a specified network link which corresponds to the service application comprises:

searching for the IP address of the specified network link which corresponds to the service application according to quintuple information corresponding to the SOCKET identifier from a pre-stored correspondence relation between the quintuple information corresponding to the SOCKET identifier and the network link.

An apparatus for transmitting packet data, comprising a connection management application module and a TCP/IP protocol stack module, wherein, the connection management application module is configured to obtain a SOCKET created by each service application, search for an IP address of a specified network link which corresponds to the service application, and transmit the SOCKET identifier, the IP address and a link modification instruction to the TCP/IP protocol stack;

the TCP/IP protocol stack module is configured to search for SOCKET file description information corresponding to the SOCKET identifier, and modify a source IP address in the SOCKET file description information to the IP address of the specified network link according to the link modification instruction; and transmit the packet data of the service application through the specified network link.

Wherein, the connection management application module is further configured to:

after a SOCKET processing module obtains the SOCKET created by a certain service application, give a prompt for an option of all network links supported by the apparatus, and search for an IP address of a network link corresponding to the option according to information of the option selected by the user.

The apparatus further comprises a storage module, wherein, the storage module is configured to store a correspondence relation between the quintuple information corresponding to the SOCKET identifier and the network link;

the connection management application module is configured to search for an IP address of a specified network link which corresponds to the service application by the following mode: searching for the IP address of the specified network link which corresponds to the service application from the correspondence relation.

In conclusion, the above method for processing a SOCKET, the method and apparatus for transmitting packet data can perform the IP binding operation across applications on a single-process or multi-process operating system, and can perform the application level traffic selection of the different data connection according to intention of the user.

PREFERRED EMBODIMENTS OF THE INVENTION

In order to make the purposes, technical schemes and advantages of the present document more clear and apparent, the embodiments of the present document will be described in detail below in conjunction with accompanying drawings. It should be illustrated that, embodiments in the present application and features in the embodiments can be combined with each other without conflict.

Figure 1:
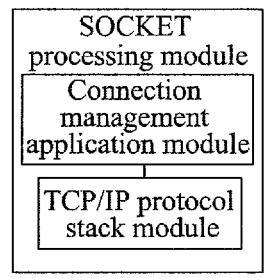
FIG. 1 is a diagram of an apparatus for processing a SOCKET according to an embodiment.

FIG. 1 is a diagram of an apparatus for processing a SOCEKT according to an embodiment; the apparatus according to the embodiment can be a chip, which is applicable to devices such as terminals, and as shown in FIG. 1, the apparatus according to the present embodiment comprises a connection management application module and a TCP/IP protocol stack module, wherein, the connection management application module is configured to obtain a SOCKET identifier corresponding to each service application, and transmit the SOCKET identifier and a modification instruction to the TCP/IP protocol stack module;

the TCP/IP protocol stack module is configured to search for SOCKET file description information corresponding to the SOCKET identifier, and modify the SOCKET file description information according to the modification instruction.

Wherein, the connection management application module is further configured to give a prompt for network link information related to the service application after obtaining a SOCKET identifier corresponding to each service application.

Figure 2:
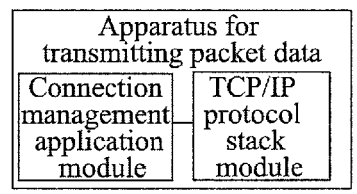
FIG. 2 is a diagram of an apparatus for transmitting packet data according to an embodiment.

FIG. 2 is a diagram of an apparatus for transmitting packet data according to the present embodiment; the apparatus according to the embodiment can be devices such as terminals, and as shown in FIG. 2, the apparatus according to the present embodiment comprises a connection management application module and a TCP/IP protocol stack module, wherein, the connection management application module is configured to obtain a SOCKET created by each service application, search for an IP address of a specified network link which corresponds to the service application, and transmit the SOCKET identifier, the IP address and the link modification instruction to the TCP/IP protocol stack;

the TCP/IP protocol stack module is configured to search for SOCKET file description information corresponding to the SOCKET identifier, and modify a source IP address in the SOCKET file description information to the IP address of the specified network link according to the link modification instruction; and transmit the packet data of the service application through the specified network link.

Wherein, the connection management application module is further configured to: after a SOCKET processing module obtains the SOCKET created by a certain service application, give a prompt for an option of all network links supporting the apparatus, and search for an IP address of a network link corresponding to the option according to information of the option selected by the user.

The apparatus according to the present embodiment can further comprise a storage module, wherein, the storage module is configured to store a correspondence relation between quintuple information corresponding to the SOCKET identifier and the network link;

the connection management application module is configured to search for an IP address of a specified network link which corresponds to the service application by the following mode: searching for the IP address of the specified network link which corresponds to the service application from the stored correspondence relation between the SOCKET file description information and the network link.

Figure 3:
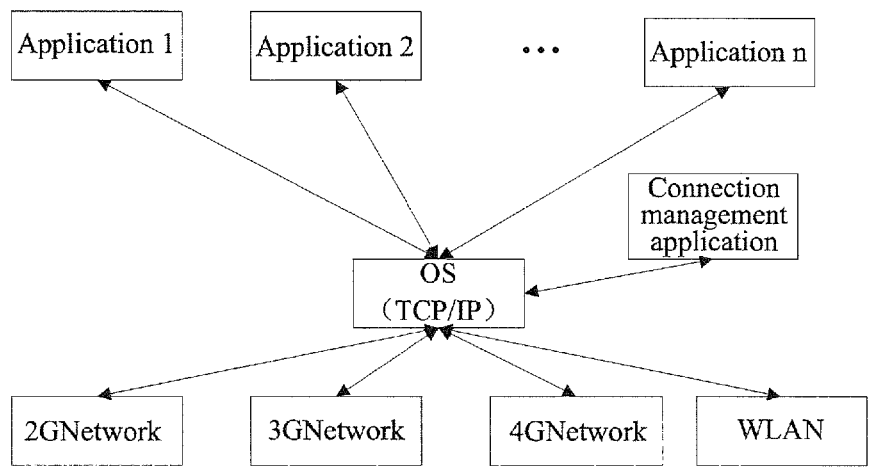
FIG. 3 is a diagram of a whole architecture of a terminal according to an embodiment.

The whole frame of the terminal according to the present embodiment is as shown in FIG. 3, and various applications on the terminal can correspond to specific services respectively, for example, IP services such as multimedia messages, Wireless Application Protocols (WAPs), Instant Messaging (IM), Packet Switched Video Telephony Services (PSVTs) etc.; such applications invoke a series of Application Programming Interfaces (APIs) of an upper layer of the TCP/IP protocol stack of the operating system layer, to create SOCEKTs such as a User Datagram Protocol (UDP), a TCP etc. for communicating with the network, and then select the traffic by the routing configuration of the TCP/IP protocol stack; and when there are multiple network links which exist simultaneously, the IP data can be distributed over the 2G network link, the 3G network link, the 4G network link, the WLAN link, or the WiMax link. Such applications on the terminal can exist on the operating system level as independent processes or independent tasks.

Due to the limitations of the routing configuration in the prior art, it is unable to realize differentiation of IP data of the application level, and therefore, the connection management application (which is equivalent to the above SOCKET processing module) is introduced, and the user can be prompted to select the link and the traffic can be selected in accordance with the intention of the user. The specified link needs to be bound when the traffic is selected, but for the binding operation of the TCP/IP protocol stack, in the prior art, this operation is unable to be implemented across processes or tasks, and therefore, the embodiments of the present document extend the TCP/IP protocol stack, so as to be able to support the SOCKET operation across tasks or processes, and implement the selection of the traffic based on the application level.

In the implementation of the Berkeley Software Distribution (BSD) TCP/IP protocol stack, the SOCKET operation is unable to be implemented across processes or tasks, because when the SOCKET interface on the upper layer of the TCP/IP protocol stack is invoked, the global SOCEKT file description information of the current task or process needs to be inquired from the SOCEKT identifier provided by the application, and each task or process has its own SOCKET file description information, and the SOCKET file description information is not shared among the tasks or processes.

When the traffic of the application level is selected, the TCP/IP protocol stack needs to be extended, and when the application of the upper layer invokes the SOCKET interface on the TCP/IP protocol stack, if the current process or task is unable to find the SOCKET file description information, the SOCKET file description information related to the SOCKET identifier is searched for on other processes by traversing all processes on the system through the relation of these processes, if the SOCKET file description information is not found, the processing is performed in accordance with the previous TCP/IP protocol stack (i.e., if the SOCKET file description information is not found, the TCP/IP protocol stack will return error information, such as an error SOCKET identifier (EBADF)), otherwise, the SOCKET file description information on other processes is used, thus the SOCKET file description information on other processes is modified, and the SOCEKT operation across tasks/processes can be implemented.

After the above SOCKET operation across tasks/processes is implemented, and the connection management application can easily control the data traffic of different applications in accordance with the selection of the user, and when there are multiple concurrent links, the packet data links of various applications can be selected application by application, and the functions of divergence and convergence of the IP data streams can be implemented.

Figure 4:
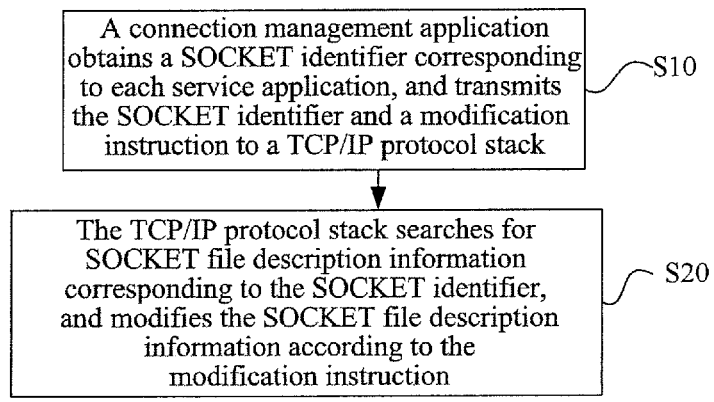
FIG. 4 is a flowchart of a method for processing a SOCKET provided by an embodiment of the present document.

A method for processing SOCKET provided by the embodiment of the present document, as shown in FIG. 4, comprises the following steps.

In S10, a connection management application obtains a SOCKET identifier corresponding to each service application, and transmits the SOCKET identifier and a modification instruction to a TCP/IP protocol stack;

In S20, the TCP/IP protocol stack searches for SOCKET file description information corresponding to the SOCKET identifier, and modifies the SOCKET file description information according to the modification instruction.

Wherein, after obtaining a SOCKET identifier corresponding to each service application, the connection management application further gives a prompt for network link information related to the service application.

Thus, the method according to the present embodiment can implement the SOCKET operation across processes or across tasks.

Figure 5:
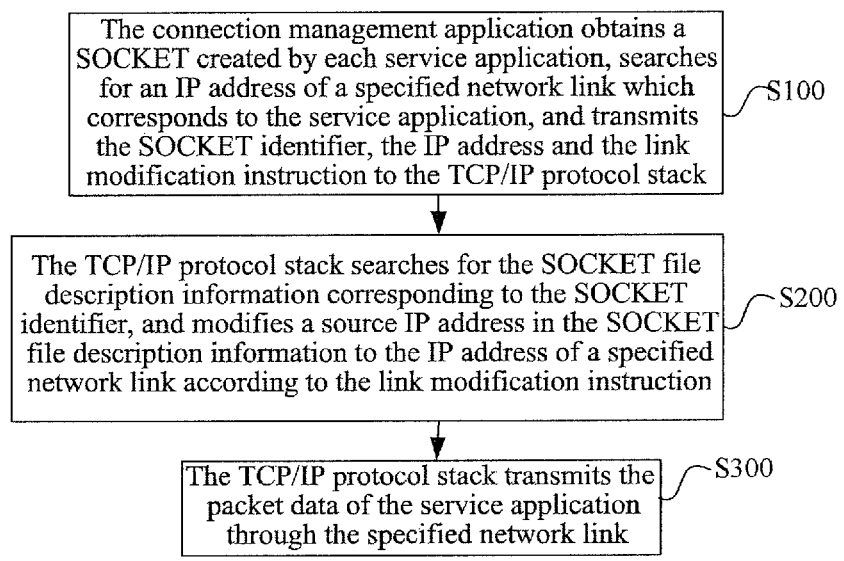
FIG. 5 is a flowchart of a method for transmitting packet data provided by an embodiment of the present document.

The embodiments of the present document further provide a method for transmitting packet data, and as shown in FIG. 5, the method comprises the following steps.

In S100, the connection management application obtains a SOCKET created by each service application, searches for an IP address of a specified network link which corresponds to the service application, and transmits the SOCKET identifier, the IP address and the link modification instruction to the TCP/IP protocol stack;

In S200, the TCP/IP protocol stack searches for the SOCKET file description information corresponding to the SOCKET identifier, and modifies a source IP address in the SOCKET file description information to the IP address of the specified network link according to the link modification instruction; and In S300, the TCP/IP protocol stack transmits the packet data of the service application through the specified network link.

Wherein, in step S100, after obtaining the SOCKET created by each service application, the connection management application further gives a prompt for an option of all supported network links, and receives one option selected by a user; wherein, the step of searching for an IP address of a specified network link which corresponds to the service application comprises: searching for an IP address of a network link corresponding to the option according to information of the option selected by the user.

In one embodiment, the step of searching for an IP address of a specified network link which corresponds to the service application further comprises: searching for the IP address of the specified network link which corresponds to the service application according to quintuple information corresponding to the SOCKET identifier from a pre-stored correspondence relation between the quintuple information corresponding to the SOCKET identifier and the network link.

In order to better understand the present document, the present document will be further described in conjunction with accompanying drawings and specific embodiments below.

Figure 6:
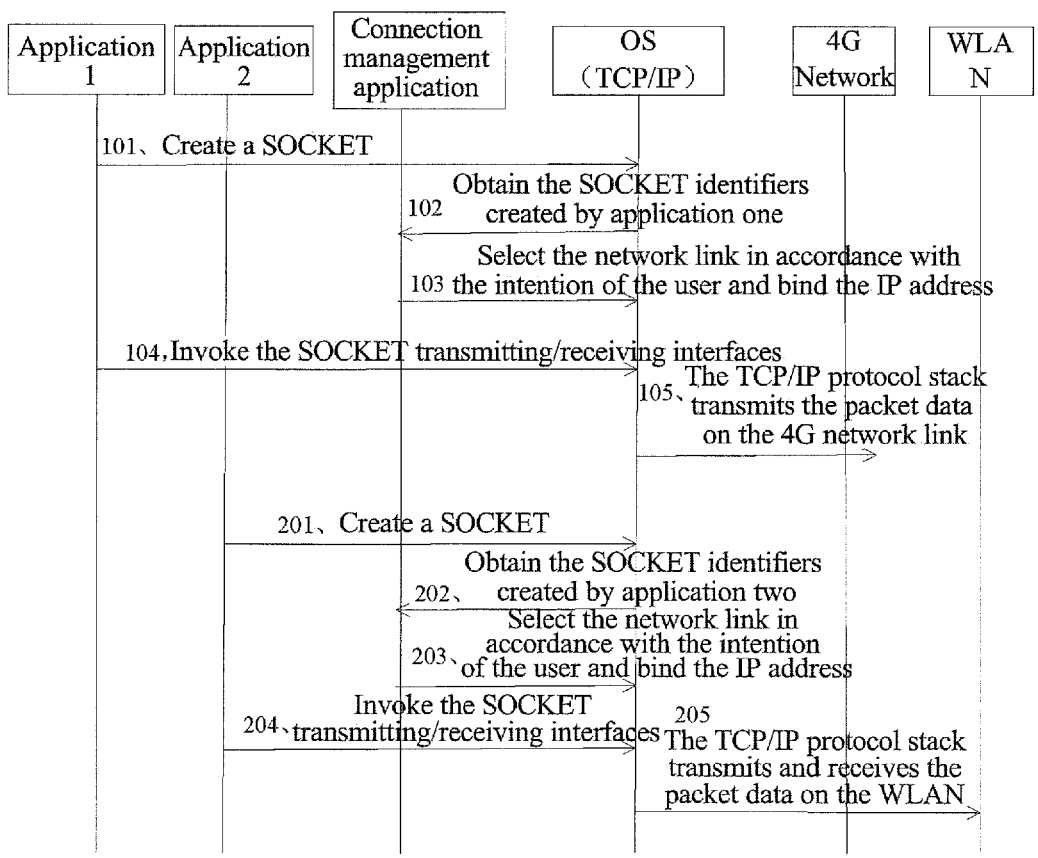
FIG. 6 is a flowchart of a method for transmitting packet data according to an application example of the present document.

As shown in FIG. 6, the example of the present application comprises two application programs: application one and application two, as well as a connection management application and a TCP/IP protocol stack, and the terminal according to the present embodiment supports two or more of the following network links: the 2G network link, the 3G network link, the 4G network link, the WLAN link and the WiMax link.

In step 101, application one invokes the SOCKET interface in a suit of API interfaces provided by the upper layer of the bottom layer TCP/IP protocol stack of the operating system to create the SOCKET, after the SOCKET is created, the SOCKET interface returns one SOCKET identifier, a corresponding relation between the SOCKET identifier and the quintuple information corresponding to the SOCKET identifier is stored on the process where the current application one is located, correspondingly on the TCP/IP protocol stack. Then, other applications can inquire such a SOCKET identifier, thus obtaining the quintuple information corresponding to the SOCKET identifier of application one;

The quintuple information corresponding to the SOCKET identifier includes: a used protocol (TCP, UDP etc.), a source IP address and a source port as well as a destination IP address and a destination port.

Each SOCKET identifier corresponds to SOCKET quintuple information, and includes: a used protocol, a source IP address, a source port, a destination IP address and a destination port.

In step 102, the connection management program obtains the SOCKET identifiers established by various applications via regularly inquiring, binds each application with a corresponding service, for example, an application with a name being mms corresponds to a multimedia message service.

In the present embodiment, after obtaining the SOCKET identifier, the connection management application prompts the user to select a traffic strategy (network link) supported by the present terminal, and the user can select, and the user can arbitrarily specify whether the data traffic of the multimedia message service is transmitted through the 2G network link, the 3G network link or the 4G network link, or is transmitted through the WLAN link or the WiMax link, and if the user does select, the traffic is selected in accordance with default configuration;

The default configuration can set a corresponding network link according to the quintuple information corresponding to the SOCKET identifier, for example, the IP packet data with a destination port being 80 pass through the WLAN link, and all other packet data with a destination port not being 80 pass through the 3G network link, or the corresponding network link being selected according to the used protocol can also be configured, or the corresponding network link strategy can also be configured according to the source IP address, the source port, the destination IP address etc.

In step 103, the user specifies the traffic selection strategy or applies a default traffic selection strategy, and the connection management application finds the current IP address of the corresponding link, and invokes the SOCKET API interface on the TCP/IP protocol stack to perform IP address binding operation.

Wherein, the connection management application transmits the SOCEKT identifier of application one, the IP address of the 4G network link which is selected by the user and the link modification instruction to the TCP/IP protocol stack of the operating system layer, thus, the TCP/IP protocol stack can find the SOCKET file description information of the process where application one is located according to the SOCKET identifier, and modify the SOCKET file description information, and in the present example, assuming that application one selects the 4G network link, and modifies the source IP address in the SOCKET file description information of the process where application one is located to the IP address of the 4G network link;

in step 104, application one invokes the SOCKET transmitting and receiving interfaces provided on the TCP/IP protocol stack to prepare to transmit and receive data, at this time, as the traffic is selected previously, this SOCKET quintuple has a determined source IP address, and the routing selection does not need to be performed again, and the IP data traffic will be transmitted in accordance with the network link selected by the user;

in step 105, as application one selects the 4G network link, the TCP/IP protocol stack will transmit and receive packet data of application one on the 4G network link.

In step 201, application two invokes the SOCKET API interface provided on the TCP/IP protocol stack to create the SOCEKT, and prepares to communicate with the network;

in step 202, the connection management application polls the SOCKET identifiers of the processes where various applications on the operating system are located, and when it is detected that application two is ready to perform network communication, if the user selects a default traffic strategy, the traffic is selected in accordance with the default traffic strategy; otherwise, the user is prompted to perform strategy configuration on the data traffic of application two;

in step 203, the connection management application binds the SOCKET of application two to the IP address of the specified link in accordance with the traffic strategy selected by the user, and in the present example, application two selects the WLAN link, and as the connection management application and the application two are not in the same task or process, the TCP/IP protocol stack needs to inquire the SOCKET file description information corresponding to the SOCKET identifier across processes, and modifies the source address of the SOCKET of application two to the IP address of the WLAN link;

in step 204, application two invokes transmitting and receiving interfaces in the SOCKET API interface provided on the TCP/IP protocol stack to transmit and receive data;

since in step 203, the SOCKET created by application two has been bound to the IP address of the WLAN link, the TCP/IP protocol stack needs not to apply routing configuration, and the packet data of application two are transmitted and received on the WLAN link directly.

Other applications on the terminal can select their own traffic strategies in accordance with application one and application two, and when there are multiple network links which exist simultaneously, various service applications can transmit and receive the packet data on the specified network link at the same time in accordance with the selection of the user respectively.

A person having ordinary skill in the art can understand that all or a part of steps in the above method can be implemented by programs instructing related hardware, which can be stored in a computer readable storage medium, such as a read-only memory, a disk or a disc etc. Alternatively, all or a part of steps in the above embodiments can also be implemented by one or more integrated circuits. Accordingly, each module/unit in the above embodiments can be implemented in the form of hardware, or can also be implemented in the form of software functional module. The present document is not limited to any particular form of a combination of hardware and software.

The above description is merely preferable embodiments of the present document, and of course, the present document can have a plurality of other embodiments. Without departing from the spirit and essence of the present document, those skilled in the art can make various corresponding changes and variations according to the present document, but all these corresponding changes and variations should belong to the protection scope of the appended claims of the present document.

INDUSTRIAL APPLICABILITY

The above method for processing a SOCKET, the method and apparatus for transmitting packet data can perform the IP binding operation across applications on a single-process or multi-process operating system, and can perform the application level traffic selection of the different data connection according to intention of the user. Therefore, the present document has very powerful industry applicability.

What is claimed is:

1. A method for transmitting packet data in a plurality of co-existed network links by a terminal which comprises an operating system, comprising:

obtaining, by a connection management application module in a processor, a SOCKET identifier which is created for each service application of a plurality of service applications;

for each service application of the plurality of service applications:

prompting, by the connection management application module, a user to select a specified network link from all supported network links for the service application, and receiving, by the connection management application module the specified network link selected by the user;

for each specified network link:

searching for, by the connection management application module, an IP address of the specified network link;

transmitting, by the connection management application module, the SOCKET identifier of the service application corresponding to the specified network link, the IP address of the specified network link, and a link modification instruction to the TCP/IP protocol stack, finding, by the TCP/IP protocol stack, a SOCKET file description information of a process where the service application corresponding to the specified network link is located, according to the SOCKET identifier of the service application corresponding to the specified network link, wherein when the SOCKET file description information is not found in a current process, the SOCKET file description information is searched for on other processes by traversing all processes on the operating system, and modifying an existing source IP address included in the SOCKET file description information into the IP address of the specified network link according to the link modification instruction for transmitting and receiving the packet data through the specified network link;

transmitting and receiving, by the plurality of service applications, packet data on the specified network links for each of the plurality of service applications at the same time.

2. The method according to claim 1, wherein, the step of searching for the IP address of the specified network link for each of the plurality of service applications comprises:

searching for the IP address of the specified network link for each of the service applications according to quintuple information corresponding to the SOCKET identifier from a pre-stored correspondence relation between quintuple information corresponding to the SOCKET identifiers and the specified network links.

3. An apparatus for transmitting packet data in a plurality of co-existed network links by a terminal which comprises an operating system, comprising a connection management application module and the operating system comprises a Transmission Control Protocol/Internet Protocol (TCP/IP) protocol stack, wherein, the connection management application module is configured to:

obtain a SOCKET identifier which is created for each service application of a plurality of service applications, for each service application of the plurality of service applications:

give a prompt for a user to select a specified network link from all supported network links for the service application, and receive the specified network link selected by the user, and for each specified network link:

search for an IP address of the specified network link, and transmit the SOCKET identifier of the service application corresponding to the specified network link, the IP address of the specified network link, and a link modification instruction to the TCP/IP protocol stack;

the TCP/IP protocol stack is configured to, for each specified network link:

find a SOCKET file description information of a process where the service application corresponding to the specified network link is located, according to the SOCKET identifier of the service application corresponding to the specified network link, wherein when the SOCKET file description information is not found in a current process, the SOCKET file description information is searched for on other processes by traversing all processes on the operating system, and modify an existing source IP address included in the SOCKET file description information into the IP address of the specified network link according to the link modification instruction for transmitting and receiving the packet data of the service application through the specified network link; and the plurality of service applications are configured to transmit and receive the packet data on the specified network links at the same time.

4. The apparatus according to claim 3, further comprising a storage module, wherein, the storage module is configured to store a correspondence relation between quintuple information corresponding to the SOCKET identifiers and specified network links;

the connection management application module is further configured to search for the IP address of the specified network link for each of the service applications by a following mode: searching for the IP address of the network link of the service application according to the quintuple information corresponding to the SOCKET identifiers from the correspondence relation in the storage module.

* * * * *